United States Patent

Krenzer

[11] Patent Number: 5,967,710
[45] Date of Patent: Oct. 19, 1999

[54] DRILLING TOOL FOR DRILLING IN SOLID METAL

[75] Inventor: Ulrich Krenzer, Zirndorf, Germany

[73] Assignee: Kennametal Hertel AG Werkzeuge + Hartstoffe, Fürth, Germany

[21] Appl. No.: 08/849,518

[22] PCT Filed: Dec. 11, 1995

[86] PCT No.: PCT/EP95/04872

§ 371 Date: Jun. 9, 1997

§ 102(e) Date: Jun. 9, 1997

[87] PCT Pub. No.: WO96/18472

PCT Pub. Date: Jun. 20, 1996

[30] Foreign Application Priority Data

Dec. 10, 1994 [DE] Germany .............................. 44 44 022
Oct. 14, 1995 [DE] Germany .............................. 195 38 391

[51] Int. Cl.[6] .................................................. B23B 51/02
[52] U.S. Cl. .................... 408/224; 407/114; 408/230; 408/233; 408/713
[58] Field of Search ................................... 408/223, 224, 408/227, 229, 230, 233, 713; 407/113–116

[56] References Cited

U.S. PATENT DOCUMENTS 4,215,957  8/1980  Holma et al. ........................... 407/114
5,688,083  11/1997  Boianjiu ................................. 408/224
5,695,303  12/1997  Boianjiu et al. ........................ 407/114
5,800,100  9/1998  Krenzer ................................. 408/224

FOREIGN PATENT DOCUMENTS

0181844  5/1986  European Pat. Off. .
4239235  5/1994  Germany .
4239236  5/1994  Germany .
9529782  11/1995  WIPO .

*Primary Examiner*—Steven C. Bishop
*Attorney, Agent, or Firm*—Nils H. Ljungman and Associates

[57] ABSTRACT

Proposed is a drilling tool for drilling in solid material, having a base body (1) containing chip flutes (5, 5a) and at least two interchangeable inserts (3, 3a) at the face of the base body (1). The inserts are arranged on the base body at different radial distances such that their working ranges partially overlap. The blades (12) of the inserts (3, 3a) are formed by two cutting edges (8, 9) which together form an obtuse angle, that is the point angle (11). The face (13) of the blades (12) has parallel profile ribs (14, 14a) which act as runners and which in the region of the cutting edges (8, 9), aligned in the direction of chip removal, extend radially inwards over a curved course relative to their installed position, toward a flank region (17) of the insert (3, 3a) near the drilling tool axis (7).

20 Claims, 5 Drawing Sheets

DRILLING TOOL FOR DRILLING IN SOLID METAL

BACKGROUND OF THE INVENTION

1. Field of the Invention

This invention relates to a drilling tool for drilling holes in solid metal, with a base body which contains at least one chip flute, with at least one replaceable cutting insert on the end surface of the base body located in a recess on the end of a chip flute, and with a blade which is preferably formed by two cutting edges which form an obtuse point angle with one another.

2. Background Information

In general usage, such drilling tools are also designated indexable insert drills.

During drilling work with such indexable insert drills, the chips are basically removed from the cutting edges after they have been bent into a curved shape. The curvature of the chip is caused by the different cutting speeds at individual points or areas of the cutting edges. Basically, the chips flow radially inward from the wall of the boring toward the axis of the drilling tool.

Such drilling tools of the prior art are equipped with replaceable cutting inserts, the faces of which carry chip shaping steps. The chip shaping steps on the faces are oriented approximately parallel to the major cutting edges (European Patent No. 0 181 844 B1), even if the chip shaping steps are hump-like structures in the manner of spot-like projections which project from the rake faces (U.S. Pat. No. 4,215,957 A). The chip shaping is conventionally also achieved by placing obstacles in the path of the chip as it is being removed. As a result of these obstacles, the chip is plastically deformed and immediately deflected in a new direction.

OBJECT OF THE INVENTION

The object of the invention is to provide a drilling tool of the type described above with chip shaping devices which promote the removal of the chips via the chip flutes.

SUMMARY OF THE INVENTION

The invention teaches that this object can be accomplished if the rake face of the blades contains chip shaping ribs located next to one another which act in the manner of runners for the chips, which chip shaping ribs, in the vicinity of the blade or of the cutting edges are oriented approximately perpendicular to the cutting edges, and from there the chip shaping ribs extend in the direction of chip removal with a curved profile with regard to their installed position radially inward toward a flank area of the insert, which flank area is close to the axis of the drilling tool. The reset replaceable inserts are each located in the end of a recess on the end surface of a drill base body, and are realized so that their chip surfaces contain chip shaping ribs which are located next to one another which act like runners on which chips slide. In the vicinity of the cutting edges of the indexable insert, the runners are oriented approximately perpendicular to the cutting edges, and from there run approximately in the chip removal direction on a curved path relative to their installation position, radially inward toward a flank area of the insert. The curved path of the chip shaping ribs or grooves is thereby selected so that it corresponds largely to the natural or optimal removal direction of the chip. This chip removal direction is not maintained with absolute reliability during drilling. Various factors which are due to changing advance speeds, the material of which the workpiece is made, etc., can cause the chip to deviate from its ideal removal direction, with the consequence that the chip spiral formed is not removed correctly from the chip space, and in particular can generate a great deal of friction. The chip shaping ribs claimed by the invention prevent this undesirable effect by promoting the removal of the chips along a curved path which runs radially inward toward the axis of the drill. The chip shaping ribs force the chips being removed to travel in the direction in which they are being removed from the cutting edges. In particular, the chip shaping ribs or grooves reflect the shape of the chips, which results in practically an automatic guidance. An additional advantageous effect of this shaping of the chip in the manner of a piece of corrugated sheet metal lies in its stiffening action which is effective in the longitudinal direction of the chip. The stiffening action of the spiral-shaped chips results in increased uniformity of the chip shaping, and thus an improvement of the chip removal from the boring, as a result of a more uniform removal of the chip. The subsequent chips, to some extent, push the previously-formed chip out of the hole. A jamming of these relatively large chip spirals between the body of the drilling tool and the wall of the hole is almost impossible.

The chip shaping ribs are preferably curved continuously toward the area in which they end. Such a configuration guarantees that the sliding movement of the chip on the chip shaping ribs and in the chip shaping grooves between the ribs takes place with as little friction and resistance as possible. The chip shaping ribs preferably run up to the flank area which flank area lies radially inward with regard to their installed position and close to the axis of the drilling tool, and there they run with an orientation which is approximately perpendicular to the axis of the drilling tool. Consequently, the chip is guided practically over the entire width of the insert which extends radially in relation to the axis of the drilling tool. It is thereby guaranteed that the chip impacts the interior wall of the chip flute exactly at a specified angle, and can then be removed with as little friction as possible.

The chip shaping ribs are formed by recesses or chip shaping grooves which are located next to and at some distance from one another, whereby the chip shaping ribs have a cross section which is curved in the form of a circular arc or an ellipse. This configuration meets the requirement for removal of the chips with the least friction possible. The chip shaping ribs can also have a somewhat trapezoidal-shaped cross section, whereby the flanks of the trapezoid can be slightly concave. As a result of this shape, and in particular as a result of the relatively sharp edge formed by the peak surface of the chip shaping ribs and a concave flank, the form-fitting engagement between the chip and the face, and thus the automatic guidance, of the chip is improved.

It is advantageous if the recesses or chip shaping ribs interrupt the cutting edges of the cutting insert. The copy of the chip shaping ribs or of the chip shaping troughs which lie between them in the back surface of the chip removed from the material to be worked then occurs practically simultaneously with the chip formation or chip removal. On account of the fact that at this point, the material can still be deformed plastically to a major extent, there is a significantly greater conformation to the chip shaping ribs on the back surface of the chip, whereby the form-fitting engagement between the chip and the chip shaping ribs, and consequently the automatic guidance of the chip, is improved. It is also advantageous if the chip shaping grooves also interrupt the near flank area of the insert which is radially inward in the installed position. The chip can then slide out of the insert into the chip flute area without resistance.

The advantage of a concave trough in the face of the insert is that the chips which are formed during the chip removal process are shaped by the concave trough or by the groove shape of the insert so that they impact the wall of the chip flute at an obtuse angle. As a result of the trough shape of the insert, the chips are already shaped so that the diameter of the chip spiral can fit easily into the volume of the chip space available. In cooperation with the automatic guidance of the chip as disclosed by the invention, an optimal removal of the chip from the chip space can therefore be guaranteed.

In many cases, and even in the majority of cases, it may be appropriate to curve the chip shaping ribs and grooves to an even greater extent than is necessary for the unimpeded removal of the chip. In other words, the chips are decelerated to a greater extent by the chip shaping ribs or grooves in the area closer to the axis of the drill than in the area which lies farther outward.

BRIEF DESCRIPTION OF THE DRAWINGS

The object of the invention is explained in greater detail with reference to the embodiments illustrated in the accompanying figures.

DESCRIPTION OF THE PREFERRED EMBODIMENT

Figure 4:
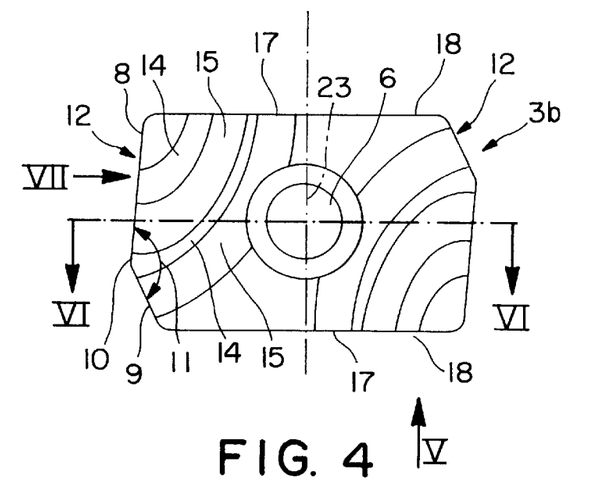
FIG. 4 shows an additional embodiment of an insert, in an overhead view.
Figure 5:
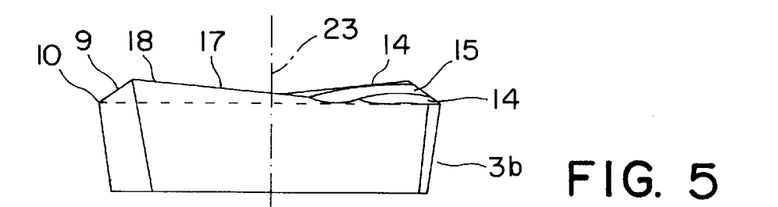
FIG. 5 shows a view of the insert shown in FIG. 4, in the direction indicated by the Arrow V.
Figure 6:
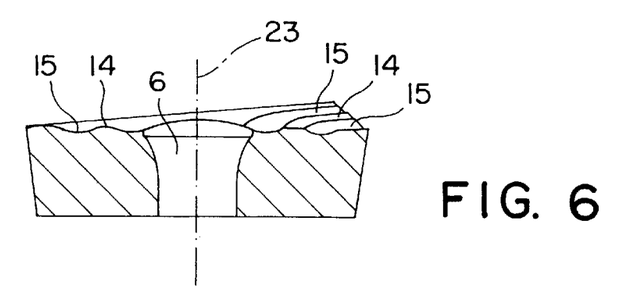
FIG. 6 shows a cross section along Line VI—VI in FIG. 4.
Figure 7:
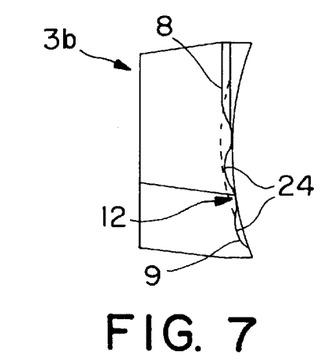
FIG. 7 shows a view along Arrow VII in FIG. 4.
Figure 8:
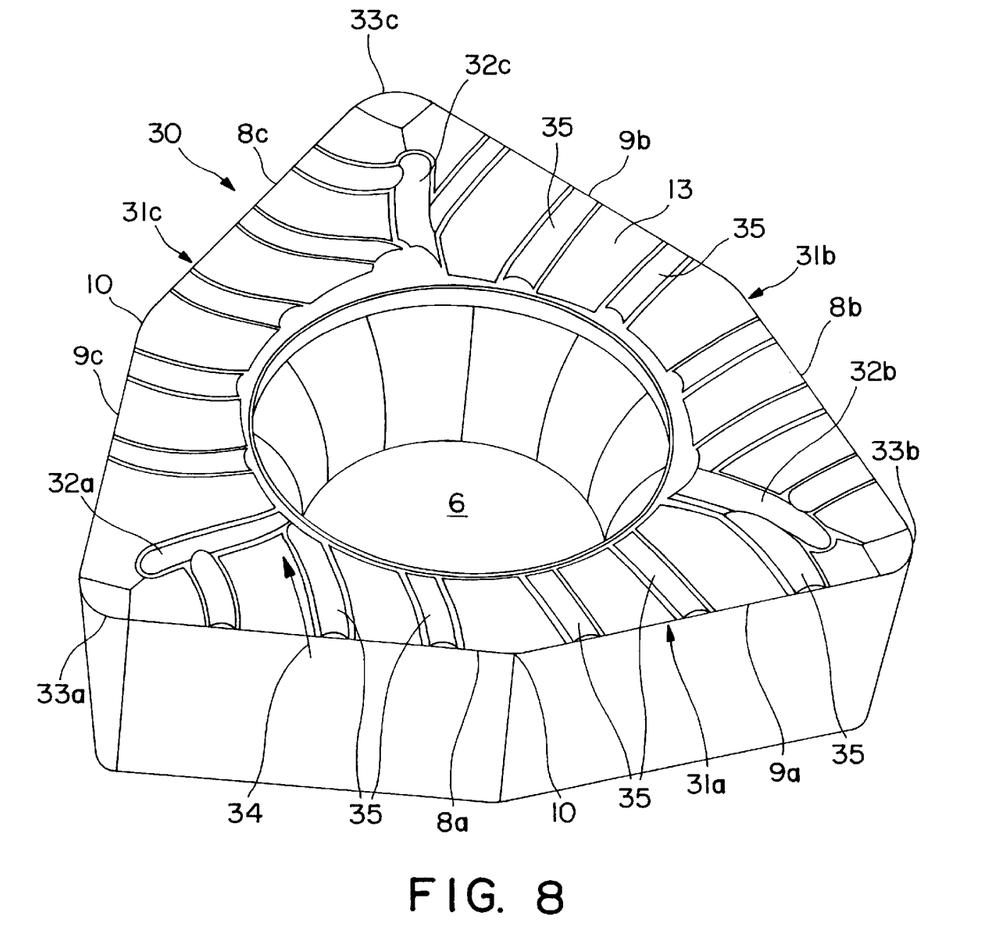
FIG. 8 shows a trigonal insert as claimed by the invention.

The drilling tool consists essentially of the base body 1 with inserts 3, 3a located in the vicinity of the drill tip 2 and realized in the form of replaceable cutting inserts. The inserts 3, 3a are inserted in recesses 4, 4a, in which recesses they are fastened, e.g. by means of a screw. For this purpose, the inserts have a central fastening hole 6. The inserts are at different radial distances from the longitudinal center axis of the base body 1, and the working ranges of the two cutting inserts 3, 3a are adjacent to one another, and overlap to some extent. The longitudinal center axis forms the axis 7 of the drilling tool. The inserts 3, 3a can have a rectangular, approximately square outline (FIGS. 1 and 4), but they can also be trigonal inserts (FIG. 8). One characteristic common to both shapes of inserts is the presence of two cutting edges 8, 9 which project vertically in cross section, and which run together into a cutting tip 10, enclose an obtuse angle 11, and together form the blade 12 of the insert. Of course, inserts with a simpler basic geometry can also be used, such as inserts with square, triangular and rhombic outlines, in which the blade does not consist of a plurality of partial blades.

The face 13 can be flat or—in a preferred form—can have a curved groove, or—in particular on trigonal inserts—it can have a spoon-shaped trough. The invention teaches that the face 13 corresponding to each blade 12 contains chip shaping ribs 14 which are located next to one another and function as runners on which chips slide, e.g. as a result of an appropriate pattern of ribs and grooves. The profile ribs 14 are characterized by a special curved shape. In the vicinity of the cutting edges 8, 9, the chip shaping ribs first run approximately perpendicular, i.e. at an approximately right angle to the cutting edges 8, 9 (see Line 22 in FIG. 2). From there they are bent radially inward in the chip removal direction, namely toward the drilling tool axis of the drilling tool.

Figure 1:
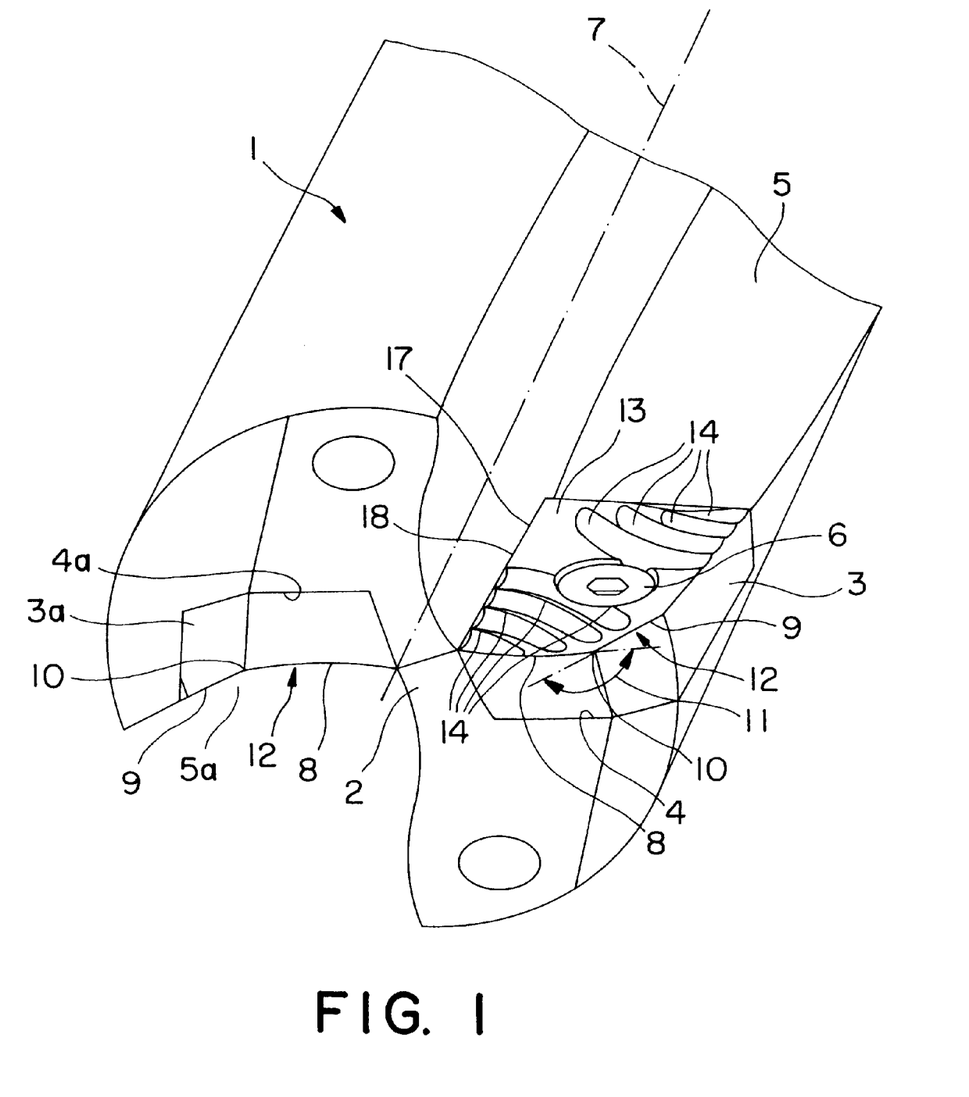
FIG. 1 shows the point end of a drilling tool as claimed by the invention with two replaceable inserts, in a perspective view.
Figure 2:
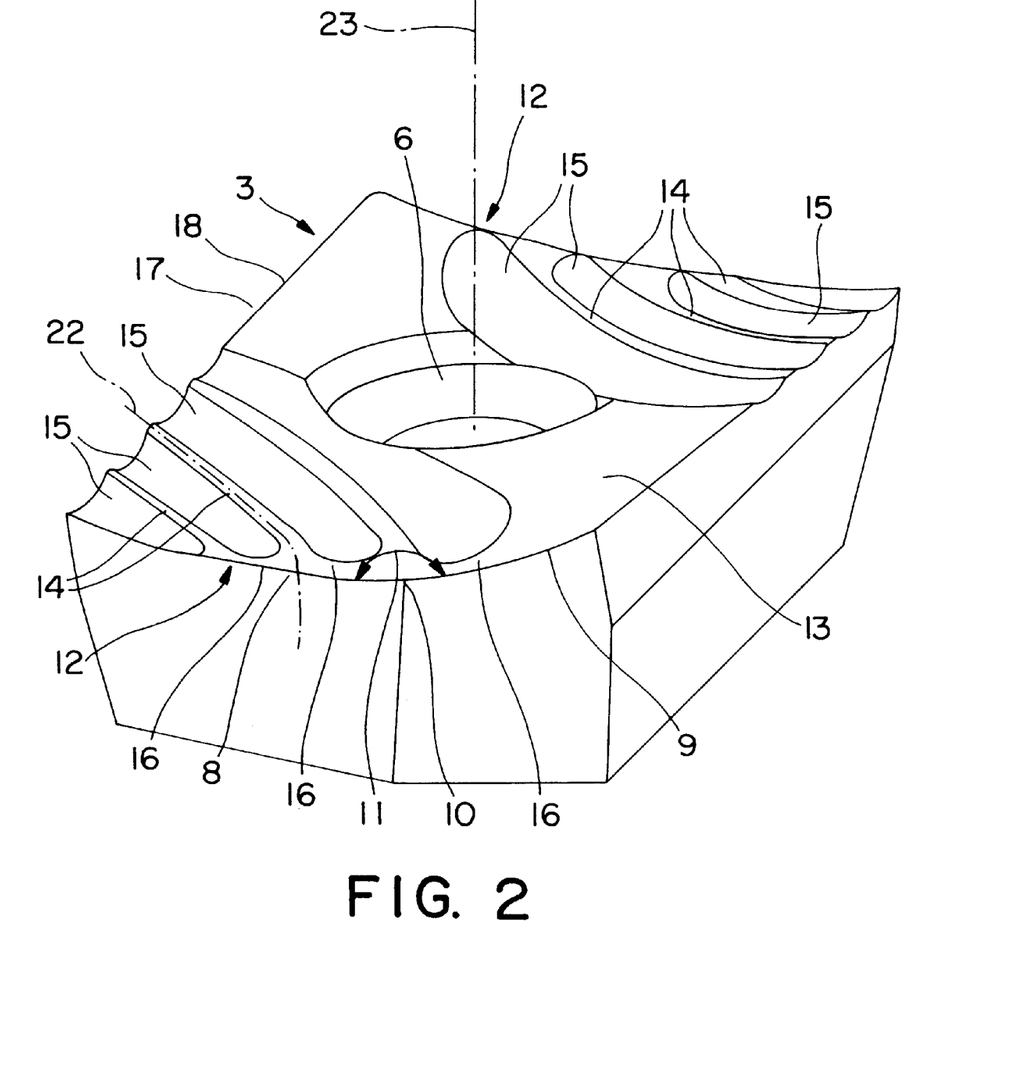
FIG. 2 shows an indexable insert as shown in FIG. 1, in a perspective view on a larger scale.
Figure 3:
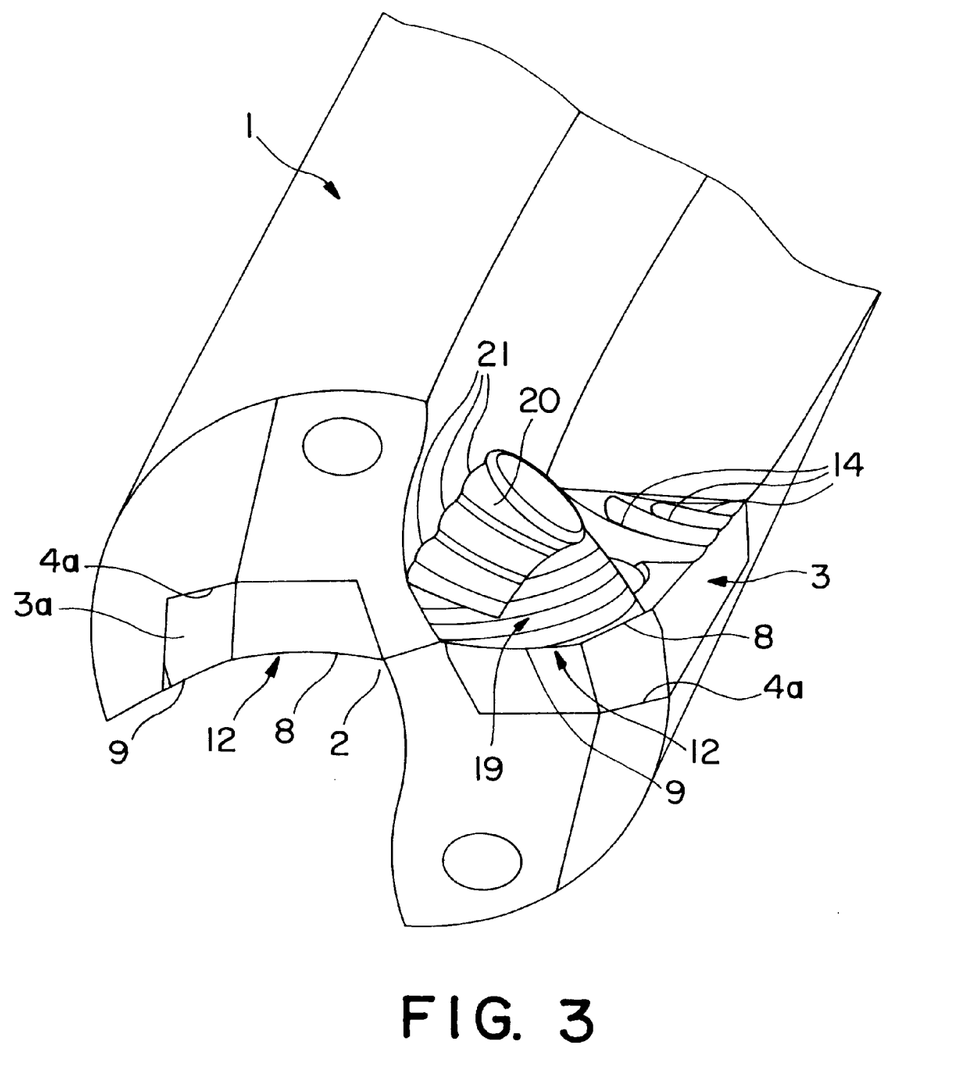
FIG. 3 shows a drilling tool as shown in FIG. 1 in perspective, to schematically illustrate the formation of a chip in the effective cutting range of the reset insert.

As noted above, the chip shaping ribs 14 are formed by making trough-shaped recesses, namely chip shaping grooves 15, in the face 13. The curve of the profile grooves 15 is selected so that the chip shaping ribs 14 which remain projecting vertically between them have the curve claimed by the invention. As shown in FIGS. 1–3, the chip shaping grooves 15 end at some distance in front of the blade 12 or the cutting edges 8 and 9. Between the end of each of the chip shaping grooves 15 and the blade 12, there are respective webs 16. The advantage of this configuration is that it simplifies the manufacturing process. The width of the webs 16 must be as small as possible, to make it possible for the chip material removed from the workpiece to flow into the chip shaping grooves. When the chip is formed, the workpiece material is still in a state in which it can more easily be deformed plastically than is the case as its distance from the cutting site increases. Therefore, the smaller the width of the webs 16, the closer the ends of the chip shaping grooves are to the chip in the plastically deformable area. For reasons of stability, there are natural limits regarding the reduction of the width of the webs 16. In the flank area 17 close to the axis 7 of the drilling tool, the chip shaping ribs 14 are oriented approximately perpendicular to the axis 7 of the drilling tool or to the lateral edge 18 of the flank area 17. Between the blade 12 in the operating position and the flank area 17 close to the axis of the insert 3, the rib curve therefore extends with a preferably uniform curvature between its two rib ends. In the flank area 17, the chip shaping troughs 15 do not end in front of the lateral edge 18, but continue through the lateral edge. The lateral edge thereby has a wavy profile in the area where the chip shaping groove 15 emerges. This configuration guarantees that the chip can be removed without resistance and can arrive in the vicinity of the chip flute of the drilling tool.

To further promote the curved removal path of the chips, the cutting angle of a cutting edge 8 or 9 preferably increases positively as the distance from the drill axis 17 increases. As a result, there is a reduced deformation of the chip caused by pressure in the radially outer areas of the blade. This different degree of pressure deformation over the chip width as a whole promotes the shaping of the chip into a spiral. The formation of a chip spiral 19 is illustrated schematically in FIG. 3. This figure also shows that the chip shaping ribs 14 and the chip shaping grooves 15, on the back surface 20 of the chip spiral 19 facing the face 13, are reproduced to a certain extent in the manner of a corrugation 21.

FIGS. 4 to 7 show an insert 3b as claimed by the invention which has a curved face 13 and which extends in a curved shape from the blade 12 to the lateral edge 18. As described above with reference to the insert 3, 3a in FIGS. 1 to 3, it is conventional on indexable inserts of the type in question to have a second blade 12 and second chip shaping ribs 14 and chip shaping grooves 15 in a symmetrical arrangement, whereby in this case there is a dyad axis of symmetry which is formed by the longitudinal center axis 23 of the fastening boring 6. The essential difference between this insert 3b and the one illustrated in FIGS. 1 to 3 is that the chip shaping grooves 15 interrupt the blade 12. The blade 12, when viewed in the direction indicated by the Arrow VII in FIG. 4, or in the direction of the longitudinal dimension of the insert 3b, therefore has a somewhat corrugated profile. The blade 12, 12' accordingly has concave grooves 24 which are separated from one another by the chip shaping ribs 15. The result of this configuration is that the negative copy of the chip shaping ribs 14 and chip shaping grooves 15 occurs directly during the chip formation, because there is no web between the blade 12 and the chip shaping groove 15. The chip spiral 19 is removed from the workpiece material from the very beginning with a corrugated rear surface 20 (as shown in FIG. 3). The chip shaping ribs 14 and chip shaping grooves 15 are in this embodiment more clearly reflected in the shape of a corrugation 21 on the rear surface 20 of the chip spiral than is the case in the embodiment illustrated in FIGS. 1–3. The form-fitting engagement between the rear surface 20, the face 19 and the chip shaping ribs 14 and chip shaping grooves 15, and thus the automatic guidance of the chip spiral 19, is more pronounced. The chip shaping properties and in particular the automatic guidance in the direction of chip removal are even more strongly pronounced with the insert 3b.

FIG. 8 shows a trigonal insert 30. Such trigonal inserts have a total of 3 blades 31a, 31b and 31c, each of which is formed by cutting edges 8, 9 which are vertical in cross section. The trigonal insert 30, on its face 13, next to the above-mentioned curved chip shaping ribs 35, has three radial ribs 32a, 32b, 32c, each of which extends along the connecting line between a corner 33 of the insert and the center of the trigonal insert. At least one of the profile ribs 35 located in the vicinity of the radial ribs 32a, 32b and 32c merges into a radial rib 32a, 32b, 32c. Corresponding to the cutting edge 8a are a total of three chip shaping ribs 35, whereby the two which are next to the insert corner 33a merge into the radial rib 32a. Of the chip shaping ribs 35 corresponding to the blade 31c and the cutting edge 9c, only the chip shaping rib 35 which is next to the insert corner 33a merges into the radial rib 32a. There are corresponding conditions in the face areas which correspond to the insert corners 33b and 33c. Except for the chip shaping ribs which are respectively closest to each of the insert corners 33a, 33b, 33c, all the chip shaping ribs 35 and the radial ribs 32a, 32b and 32c merge into the positioning hole 6 or they extend to the edge of the boring 6. In contrast to the insert illustrated in FIGS. 1 or 4, the grooves located between the chip shaping ribs 35 are wider and less trough-shaped. The configuration is designed so that if the chip shaping ribs 35 and the radial ribs 32 are ignored, the outer surface or the face 13 is a continuous surface, possibly with a concave groove, or is spoon-shaped.

The purpose of the radial ribs 32 is to remove a chip which has been cut off by the blade, such as the blade 31, from the workpiece, and to move in the direction of the arrow 34 on the radial rib 32a, in the manner of a chip guide, away from the face 13. The chip is thereby prevented from coming into contact laterally with a chip shaping rib of the blade 31c which is next to the axis 7 of the drilling tool in the installed position, and thereby being deflected in an uncontrolled manner from the optimal chip removal direction. The formation of a chip spiral can also be achieved, when a trigonal insert is used, by a face 13 which is concave or has a groove so that it is spoon-shaped.

One feature of the invention resides broadly in the drilling tool for drilling holes in solid metal—with a base body 1 which contains at least one chip flute 5, 5a,—with at least one replaceable cutting insert 3, 3a on the end surface of the base body 1 located in a recess 4, 4a on the end of a chip flute 5, 5a, and—with a blade 12 which is preferably formed by two cutting edges 8, 9 which form an obtuse point angle 11 with one another, characterized by the fact that the rake face 13 of the blades 12 contains chip shaping ribs 14, 14a located next to one another which act in the manner of runners for the chips, which chip shaping ribs, in the vicinity of the blade 12 or of the cutting edges 8, 9, are oriented approximately perpendicular to the cutting edges, and from there the chip shaping ribs extend in the direction of chip removal with a curved profile with regard to their installed position radially inward toward a flank area 17 of the insert 3, 3a, which flank area 17 is close to the axis 17 of the drilling tool.

Another feature of the invention resides broadly in the tool characterized by a constant curvature of the chip shaping ribs 14, 14a toward their tapered terminal area.

Yet another feature of the invention resides broadly in the drilling tool characterized by the fact that the chip shaping ribs 14, 14a extend with a continuous curved path radially inward to the flank area 17 of the insert 3, 3a, where they are oriented perpendicular to the axis 7 of the drilling tool.

Still another feature of the invention resides broadly in the drilling tool characterized by the fact that the chip shaping ribs 14, 14a are formed by recesses or chip shaping grooves 15 which are located next to and at a distance from one another.

A further feature of the invention resides broadly in the drilling tool characterized by the fact that the chip shaping ribs 14, 14a are realized so that in cross section, they have approximately the shape of a circular arc or ellipse.

Another feature of the invention resides broadly in the drilling tool characterized by the fact that in cross section, the chip shaping ribs 14, 14a have the shape of a trapezoid, the flanks of which are concave.

Yet another feature of the invention resides broadly in the drilling tool characterized by the fact that the chip shaping ribs 15 interrupt the blade 12, 12'.

Still another feature of the invention resides broadly in the drilling tool characterized by the fact that the chip shaping grooves 15 interrupt the lateral edge 18 which defines the flank area 17 of the insert 3, 3a.

A further feature of the invention resides broadly in the drilling tool characterized by at least two chip shaping ribs 14, 14a which are located next to one another and correspond to a blade 12.

Another feature of the invention resides broadly in the drilling tool characterized by the fact that the rake faces 13 of the inserts 3, 3a are concave.

Yet another feature of the invention resides broadly in the drilling tool characterized by the fact that the curvature of the chip shaping ribs 14, 14a is greater or less than the curvature of the unhindered or optimal chip removal path.

Still another feature of the invention resides broadly in the drilling tool characterized by the fact that the insert is a trigonal insert 30 which has a central fastening hole 6, on the face 13 of which there are three radial ribs 32a, 32b, 32c:—each of which runs along the connecting line between one corner 33a, 33b, 33c of the insert and the center of the trigonal insert 30,—and into which at least one of the chip shaping ribs 14 next to a corner 33a, 33b, 33c of the insert merges.

A further feature of the invention resides broadly in the drilling tool characterized by the fact that at least the chip shaping ribs 14 which do not merge into a radial rib 32a, 32b, 32c extend to the central fastening hole 6.

Another feature of the invention resides broadly in the drilling tool characterized by the fact that the cutting angle of a cutting edge 9 which is farther from the axis 7 of the drilling tool has a greater positive component than the cutting angle of a cutting edge 8 of the same insert 3, 3a which lies closer to the axis 7 of the drilling tool.

The invention as described hereinabove in the context of the preferred embodiments is not to be taken as limited to all of the provided details thereof, since modifications and variations thereof may be made without departing from the spirit and scope of the invention.

NOMENCLATURE

1 Base body
2 Drill tip
3 Insert
3a Insert
3b Insert
4, 4a Recess
5, 5a Chip flute
6 Fastening boring
7 Axis of boring tool
8 Cutting edge
9 Cutting edge
10 Cutting tip
11 Point angle
12 Blade
13 Face
14 Chip shaping rib
15 Chip shaping groove
16 Web
17 Flank area
18 Lateral edge
19 Chip spiral
20 Rear surface
21 Corrugation
22 Line
23 Longitudinal center axis
24 Trough
30 Trigonal insert
31a Blade
31b Blade
31c Blade
32a Radial rib
32b Radial rib
32c Radial rib
33a Insert corner
33b Insert corner
33c Insert corner
34 Direction of arrow
35 Profile ribs

I claim:

1. A drilling tool comprising:
   a drill body;
   said drill body having an axis of rotation;
   a drill tip disposed at a free end of said drill body;
   a chip flute to carry chips away from said drill tip;
   a cutting blade to produce and shape chips;
   said cutting blade comprising a cutting edge;
   said cutting blade comprising a surface;
   said surface being disposed adjacent to said cutting edge;
   said cutting blade comprising at least one chip shaping rib configured to direct and shape chips produced by said cutting edge;
   said at least one chip shaping rib being at least partially disposed on said surface;
   said at least one chip shaping rib having a length extending along said surface;
   said at least one chip shaping rib having a width dimension substantially transverse to the length dimension, the width dimension being substantially less than the length dimension;
   said at least one chip shaping rib comprising a first end portion and a second end portion;
   said first end portion of said at least on chip shaping rib being disposed adjacent to said cutting edge;
   said first end portion having a length dimension disposed along the length dimension of said at least one chip shaping rib;
   the length dimension of said first end portion of said at least one chip shaping rib being disposed substantially perpendicular to said cutting edge;
   said at least one chip shaping rib is configured with a curved shape; and
   said at least one chip shaping rib is configured to extend lengthwise along said surface in a direction away from said cutting edge and towards the axis of rotation of said drill body.

2. The drilling tool according to claim 1, wherein said at least one chip shaping rib is configured with a curved shape having a substantially constant curvature over substantially the entire length of said at least one chip shaping rib.

3. The drilling tool according to claim 2, wherein:
   said second end portion of said at least one chip shaping rib is disposed adjacent to said axis of rotation;
   said second end portion of said at least one chip shaping rib has a length dimension disposed in a direction along the length dimension of said at least one chip shaping rib; and
   the length dimension of said second end portion of said at least one chip shaping rib is disposed substantially perpendicular to the axis of rotation.

4. The drilling tool according to claim 3, wherein:
   said cutting blade comprises at least two chip shaping grooves configured to direct and shape chips produced by said cutting edge;
   said at least two chip shaping grooves are disposed adjacent to said at least one chip shaping rib; and
   said at least two chip shaping grooves are disposed and configured to form said at least one chip shaping rib between said at least two chip shaping grooves.

5. The drilling tool according to claim 4, wherein:
   said at least one chip shaping rib has a cross-section disposed transverse to the length of said at least one chip shaping rib; and
   at least a portion of said at least one chip shaping rib is configured to have the cross-section substantially shaped in the form of one of:
   a circular arc; and
   an ellipse.

6. The drilling tool according to claim 4, wherein:
   said at least one chip shaping rib has a cross-section disposed transverse to the length of said at least one chip shaping rib;
   at least a portion of said at least one chip shaping rib is configured to have a substantially trapezoid shaped cross-section;

said substantially trapezoid shaped cross-section comprises a central peak surface flanked by two side surfaces; and said two side surfaces are configured to be concave shaped.

7. The drilling tool according to claim 4, wherein said at least one chip shaping rib is configured to continue through and interrupt said cutting edge.

8. The drilling tool according to claim 7, wherein said drilling tool comprises:

a cutting insert removably connected to said drill body;

said cutting insert comprises said cutting blade;

said cutting insert comprises a lateral edge disposed adjacent to the axis of rotation; and said at least two chip shaping grooves are disposed to continue through and interrupt said lateral edge of said cutting insert.

9. The drilling tool according to claim 8, wherein:

said at least one chip shaping rib comprises at least two chip shaping ribs;

said at least two chip shaping ribs are disposed adjacent to one another;

said first end portion comprises a first end portion of each of said at least two chip shaping ribs; and said first end portions of said at least two chip shaping ribs are disposed adjacent to said cutting edge.

10. The drilling tool according to claim 9, wherein:

said surface of said cutting blade is a surface disposed on said cutting insert; and said surface of said cutting insert is configured to be concave.

11. The drilling tool according to claim 10, wherein:

said cutting insert is configured to direct chips in a chip removal path in the absence of said chip shaping ribs;

the chip removal path has a curvature;

said at least two chip shaping ribs are configured with a curved shape having a curvature; and the curvature of said at least two chip shaping ribs being one of:

greater than the curvature of said chip removal path; and less than the curvature of said chip removal path.

12. The drilling tool according to claim 11, wherein:

said cutting edge comprises a first portion and a second portion;

said first portion of said cutting edge is disposed closer to the axis of rotation than the second portion of said cutting edge;

said cutting blade is configured to have a first cutting angle adjacent to said first portion of said cutting edge;

said cutting blade is configured to have a second cutting angle adjacent to said second portion of said cutting edge; and said second cutting angle has a greater positive component than said first cutting angle.

13. The drilling tool according to claim 1, wherein said drilling tool comprises:

a cutting insert removably connected to said drill body;

said cutting insert comprises said cutting blade; and said at least one chip shaping rib being configured with a curved shape having a substantially constant curvature over substantially the entire length of said at least one chip shaping rib.

14. The drilling tool according to claim 13, wherein:

said second end portion of said at least one chip shaping rib is disposed adjacent to said axis of rotation;

said second end portion of said at least one chip shaping rib has a length dimension disposed in a direction along the length dimension of said at least one chip shaping rib; and the length dimension of said second end portion of said at least one chip shaping rib is disposed substantially perpendicular to the axis of rotation.

15. The drilling tool according to claim 14, wherein:

said cutting blade comprises at least two chip shaping grooves configured to direct and shape chips produced by said cutting edge;

said at least two chip shaping grooves are disposed adjacent to said at least one chip shaping rib; and said at least two chip shaping grooves are disposed and configured to form said at least one chip shaping rib between said at least two chip shaping grooves.

16. The drilling tool according to claim 15, wherein:

said at least one chip shaping rib has a cross-section disposed transverse to the length of said at least one chip shaping rib;

at least a portion of said at least one chip shaping rib is configured to have the cross-section substantially shaped in the form of one of:

a circular arc;

an ellipse; and a trapezoid comprising a central peak surface flanked by two concave shaped side surfaces; and said at least one chip shaping rib is configured to continue through And interrupt said cutting edge.

17. A cutting insert for a drilling tool, said cutting insert comprising:

substantially three sides and being configured to be trigonal in shape;

an arrangement for being removably connectable to a drill body;

three corners;

a center disposed substantially equidistant from said three corners;

each of said three corners being disposed between two adjacent ones of said substantially three sides;

each of said substantially three sides comprising a cutting blade to produce and shape chips;

each of said cutting blades comprising a cutting edge;

said cutting blades comprising a surface;

said surface being disposed adjacent to said cutting edges;

said cutting blades comprising a plurality of chip shaping ribs configured to direct and shape chips produced by said cutting edge;

said plurality of chip shaping ribs being at least partially disposed on said surface;

each of said plurality of chip shaping ribs having a length dimension extending along said surface;

each of said plurality of chip shaping ribs having a width dimension substantially transverse to the length dimension;

each of said plurality of chip shaping ribs comprising a first end portion and a second end portion;

said first end portion of each of said chip shaping ribs being disposed adjacent to one of said cutting edges;

said first end portion of each of said chip shaping ribs having a length dimension disposed along the length dimension of said at least one chip shaping rib;

the length dimension of said first end portions of said plurality of chip shaping ribs being disposed substantially perpendicular to a respective one of said cutting edges;

said chip shaping ribs being configured with a curved shape;

said chip shaping ribs of a respective cutting edge are configured to extend lengthwise along said surface in a direction away from said respective cutting edge and towards the axis of rotation of said drill body upon said respective cutting edge being positioned in a position for cutting chips;

a first rib being disposed in a direction extending substantially from a first of said three corners to the center;

a second rib being disposed in a direction extending substantially from a second of said three corners to the center;

a third rib being disposed in a direction extending substantially from a third one of said three corners to the center;

at least a first of said chip shaping ribs being disposed adjacent to said first of said three corners;

a second end portion of said at least a first of said chip shaping ribs being disposed to merge into said first rib;

at least a second of said chip shaping ribs being disposed adjacent to said second of said three corners;

a second end portion of said at least a second of said chip shaping ribs being disposed to merge into said second rib;

at least a third one of said chip shaping ribs being disposed adjacent to said third one of said three corners;

a second end portion of said at least a third one of said chip shaping ribs being disposed to merge into said third rib.

18. The cutting insert according to claim 17, wherein:

said at least a first of said chip shaping ribs, said at least a second of said chip shaping ribs, and said at least a third one of said ship shaping ribs together are a first group of said chip shaping ribs;

said chip shaping ribs comprise a second group of chip shaping ribs;

each of said chip shaping ribs of said second group of chip shaping ribs is disposed to extend to not merge into one of said first, second, and third ribs; and said first group of chip shaping ribs is different from said second group of chip shaping ribs.

19. A drilling tool comprising:

a drill body;

said drill body having an axis of rotation;

a drill tip disposed at a free end of said drill body;

a chip flute to carry chips away from said drill tip;

a cutting blade to produce and shape chips;

said cutting blade comprising a cutting edge;

said cutting blade comprising a surface;

said surface being disposed adjacent to said cutting edge;

said cutting blade comprising at least one chip shaping rib configured to direct and shape chips produced by said cutting edge;

said at least one chip shaping rib being at least partially disposed on said surface;

said at least one chip shaping rib having a length dimension extending along said at least one chip shaping rib;

said at least one chip shaping rib having a width dimension substantially transverse to the length dimension, the width dimension being substantially less than the length dimension;

said at least one chip shaping rib comprising a first end portion and a second end portion;

said first end portion of said at least one chip shaping rib being disposed adjacent to said cutting edge;

said first end portion having a length dimension disposed along the length dimension of said at least one chip shaping rib;

the length dimension of said first end portion of said at least one chip shaping rib being disposed at an angle to said cutting edge; and the angle being substantially greater than a zero angle.

20. The drilling tool according to claim 19, wherein:

said at least one chip shaping rib is configured with a curved shape; and said at least one chip shaping rib is configured to extend lengthwise along said surface in a direction away from said cutting edge and towards the axis of rotation of said drill body.

* * * * *

UNITED STATES PATENT AND TRADEMARK OFFICE
CERTIFICATE OF CORRECTION

PATENT NO. : 5,967,710
DATED : October 19, 1999
INVENTOR(S) : Ulrich KRENZER

It is certified that error appears in the above-identified patent and that said Letters Patent is hereby corrected as shown below:

In column 8, line 14, Claim 1, after 'least', delete "on" and insert --one--.

In column 11, line 41, Claim 18, after 'said', delete "ship" and insert --chip--.

Signed and Sealed this

Seventh Day of November, 2000

Attest:

Q. TODD DICKINSON

Attesting Officer     Director of Patents and Trademarks